(12) United States Patent
Hirano et al.

(10) Patent No.: US 8,351,159 B2
(45) Date of Patent: Jan. 8, 2013

(54) SUSPENSION FOR PROTECTING A COMPONENT FROM MECHANICAL SHOCK

(75) Inventors: Toshiki Hirano, San Jose, CA (US);
Haruhide Takahashi, Kanagawa (JP);
Shinobu Hagiya, Fujisawa (JP);
Shigenori Takada, EngyoFujisawa (JP);
Kousaku Wakatsuki, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 473 days.

(21) Appl. No.: 12/578,754

(22) Filed: Oct. 14, 2009

(65) Prior Publication Data
US 2011/0085270 A1 Apr. 14, 2011

(51) Int. Cl.
*G11B 5/54* (2006.01)
*G11B 5/58* (2006.01)
*G11B 5/60* (2006.01)

(52) U.S. Cl. ............... 360/245.7; 360/244.1; 360/245.3
(58) Field of Classification Search ............... 360/245.3, 360/245.4, 245.5, 245.6, 245.7, 244.1
See application file for complete search history.

(56) References Cited

U.S. PATENT DOCUMENTS

| | | | |
|---|---|---|---|
| 6,115,223 A | 9/2000 | Berg et al. | |
| 6,222,706 B1 | 4/2001 | Stefansky et al. | |
| 6,266,212 B1 | 7/2001 | Coon | |
| 6,297,936 B1 | 10/2001 | Kant et al. | |
| 6,744,603 B1 * | 6/2004 | Soeno et al. | 360/245.6 |
| 7,221,542 B2 | 5/2007 | Yao et al. | |
| 7,230,800 B2 * | 6/2007 | Hirano et al. | 360/294.3 |
| 7,386,932 B2 | 6/2008 | Girard | |
| 2003/0223154 A1 | 12/2003 | Yao | |
| 2004/0061969 A1 * | 4/2004 | Yang et al. | 360/78.05 |
| 2007/0153429 A1 | 7/2007 | Yao et al. | |
| 2008/0074794 A1 * | 3/2008 | Lee et al. | 360/245.3 |
| 2008/0144224 A1 * | 6/2008 | Yao | 360/245.4 |
| 2008/0247088 A1 | 10/2008 | Yao et al. | |
| 2008/0304183 A1 * | 12/2008 | Kwon et al. | 360/245.3 |
| 2009/0021857 A1 * | 1/2009 | Shelor | 360/77.16 |
| 2010/0238581 A1 * | 9/2010 | Nakamura et al. | 360/59 |
| 2010/0259854 A1 * | 10/2010 | Yao et al. | 360/294.4 |

OTHER PUBLICATIONS

Shock Analysis of MEMS Actuator Integrated with HGS for Operational and Non-operational HDD, Lim, B.B. et al., Digest of the Asia-Pacific Magnetic Recording Conference, pp. WE-P-18-01-WE-P-18-02, publication date: Aug. 27-29, 2002., available online at: http://ieeexplore.ieee.org/stamp/stamp.jsp?tp=&arnumber=1037704&isnumber=22246.

\* cited by examiner

*Primary Examiner* — Jefferson Evans
(74) *Attorney, Agent, or Firm* — Christopher J. Brokaw; Brokaw Patent Law PC

(57) ABSTRACT

Approaches for protecting a component when a hard-disk drive (HDD) experiences a mechanical shock. An HDD includes a suspension comprising a load beam, a gimbal, and a flexure tongue. A component, such as a microactuator, is mounted on the suspension. The flexure tongue extends to at least the edge of the microactuator that is furthest from the gimbal. The flexure tongue prevents the microactuator from contacting the load beam when the HDD receives a mechanical shock. Alternately, the flexure tongue may comprise a tip portion that extends beyond the edge of the microactuator that is furthest from the gimbal, and the tip portion of the flexure tongue may deform to act as shock absorber when the HDD receives a mechanical shock. Alternately or additionally, a padding material may be used to prevent the microactuator or the flexure tongue from contacting the load beam when the HDD receives a mechanical shock.

11 Claims, 8 Drawing Sheets

SUSPENSION FOR PROTECTING A COMPONENT FROM MECHANICAL SHOCK

FIELD OF THE INVENTION

Embodiments of the invention relate to protecting a component of a hard-disk drive (HDD) from mechanical shock.

BACKGROUND OF THE INVENTION

The operation of certain computer equipment can be negatively affected by the presence of environmental hazards, such as airborne contaminants. To prevent this harm from occurring, some sensitive equipment may be housed in an enclosure that is designed to keep out airborne contaminants.

An example of a piece of sensitive equipment housed within a protective enclosure is a hard-disk drive (HDD). An HDD is a non-volatile storage device, which is housed in a protective enclosure, that stores digitally encoded data on one or more circular platters having magnetic surfaces. When an HDD is in operation, each platter is rapidly rotated by a spindle system. Data is read from and written to a platter using a read/write head which is positioned over a specific location on a platter by an actuator. The read/write head may be mounted on a slider, which itself may be mounted on a microactuator. A microactuator is responsible for moving the slider relative to a suspension so that the slider may precisely adjust the position of the read/write head to enable the read/write head to read data from and write data to the surface of the platter.

A read/write head uses a magnetic field to read data from and write data to the surface of a platter. As a magnetic dipole field decreases rapidly with distance from a magnetic pole, the space between a read/write head and the surface of a platter must be tightly controlled. To provide a uniform distance between a read/write head and the surface of a platter, an actuator relies on air generated by a self-acting air bearing to support the read/write heads at the proper distance away from the surface of a platter while the platter rotates. A read/write head therefore is said to "fly" over the surface of a platter. That is, the air pulled along by a spinning platter forces the head away from the surface of the platter. When a platter stops spinning, a read/write head must either "land" on the platters or be pulled away.

Very small airborne particles, such as the size of 10 nm to 1000 nm (1 micron), may adhere to the air bearing surfaces of either a read/write head or deposit on the surface of the magnetic platters (disk stack). When an airborne particle becomes attached to the surface of either a read/write head or a platter, it is more likely that a read/write head may not read data properly or may scrape across the surface of a platter, which could grind away the thin magnetic film of the platter and cause data loss and potentially render the HDD inoperable.

The normal operation of a HDD may also be negatively impacted by a mechanical shock. For example, if a HDD is dropped or bumped, electrical components within the HDD may become damaged. Such damage may negatively affect the performance of the HDD or may introduce harmful airborne particles within the enclosure of the HDD.

SUMMARY OF THE INVENTION

Techniques are provided for protecting one or more components of a hard-disk drive (HDD) from mechanical shock. According to one approach, the component of the hard-disk drive (HDD) that is protected from mechanical shock is the microactuator. According to an embodiment of the invention, the microactuator is prevented from making contact with a load beam of a suspension when the hard-disk drive (HDD) comprising the microactuator experiences a mechanical shock. Consequently, when an HDD experiences a mechanical shock, the likelihood of (a) the microactuator being damaged and (b) the introduction of harmful airborne particles within the enclosure of the HDD are reduced or eliminated.

Figure 1:
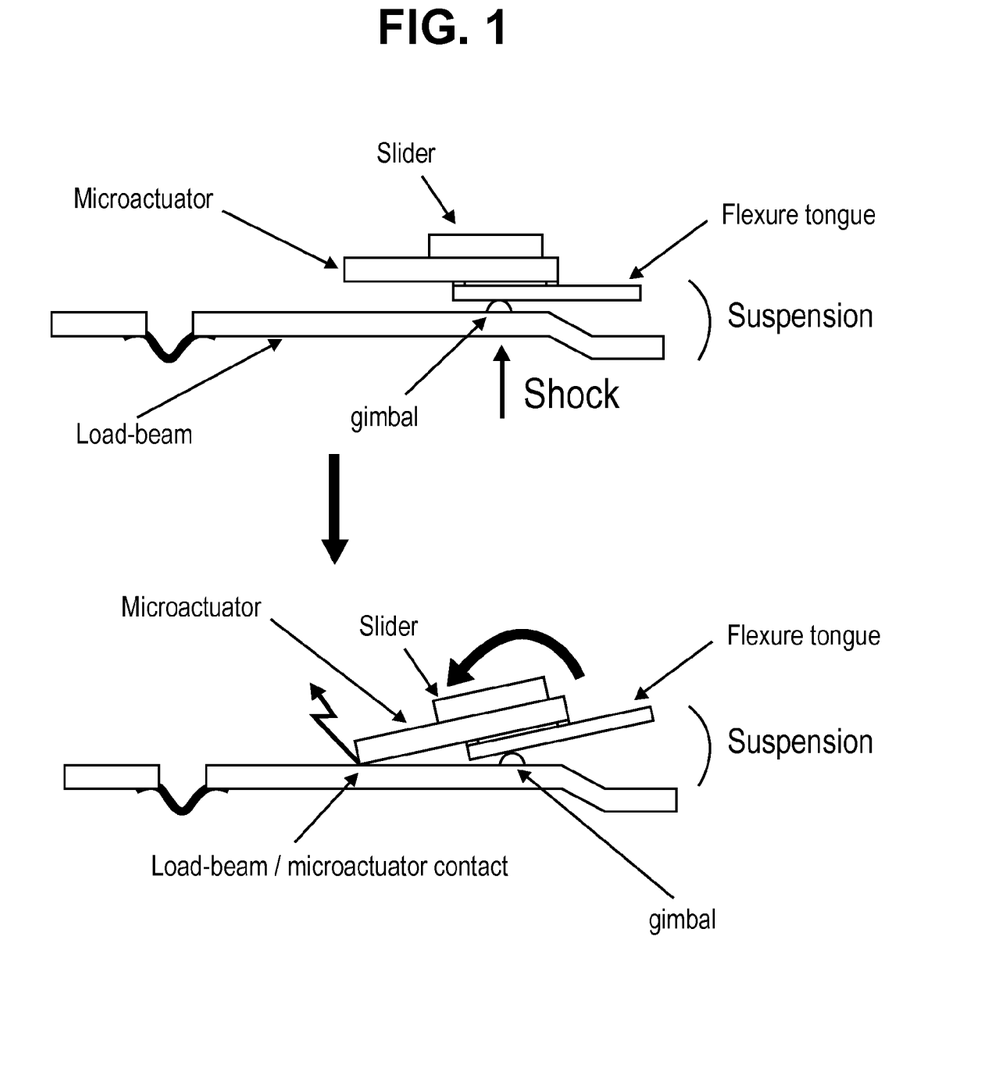
FIG. 1 is an illustration of a microactuator mounted on a suspension according to prior approaches.

FIG. 1 is an illustration of a microactuator mounted on a suspension according to prior approaches. A microactuator is responsible for moving a slider relative to the suspension so that the slider may precisely adjust the position of the read/write head to enable the read/write head to read data from and write data to the surface of the platter. As shown in FIG. 1, when the microactuator experiences a mechanical shock, the microactuator may make contact with the load beam of the suspension. This is so because a mechanical shock applied to the HDD may cause the suspension assembly to shake or vibrate. The suspension assembly is typically designed such that the slider and the microactuator may be easily moved in the pitch and roll direction to enable the slider to follow the surface of the disk even if the surface of the disk has a small tilt or angle. Hence, after experiencing a mechanical shock, the microactuator and the slider may shake or vibrate mainly in the pitch and roll direction, which can cause the microactuator to forcefully strike the load beam of the suspension (as shown by FIG. 1). It is observed that when the head gimbal assembly is in an unloaded state in the HDD using a load/unload mechanism, or in a free state (e.g., during the assembly process), the slider and the microactuator may be easily moved in the pitch and roll direction by a mechanical shock.

Forceful contact between the microactuator and the load beam of the suspension may cause the microactuator to break, chip, or crack, as the microactuator is typically implemented using a relatively fragile silicon material relative to the composition of other components in the HDD. Any damage to the microactuator may negatively affect the performance of the microactuator. Also, forceful contact between the microactuator and the load beam of the suspension may cause small particles of the microactuator and/or the load beam to break off and become airborne, thereby introducing harmful airborne particles into the enclosure of the HDD, which may also negatively impact performance of the HDD.

Figure 2:
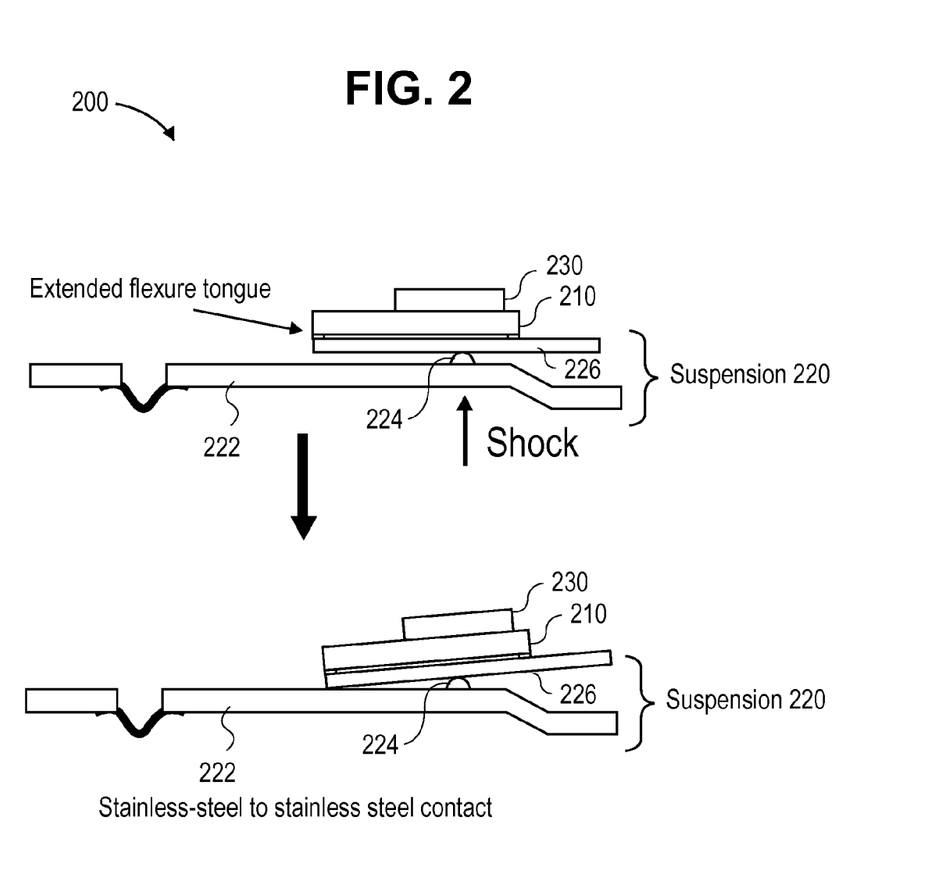
FIG. 2 is an illustration of a microactuator mounted on a suspension according to a first embodiment of the invention.

FIG. 2 is an illustration of a microactuator mounted on a suspension according to a one embodiment of the invention. FIG. 2 depicts an HDD that includes a suspension comprising a load beam, a gimbal, and a flexure tongue. A microactuator is mounted on the suspension. The flexure tongue extends to at least the edge of the microactuator that is furthest from the gimbal. The flexure tongue prevents the microactuator from making contact with the load beam when the HDD receives a mechanical shock. As the flexure tongue and the load beam may both be implemented using stainless steel, the contact between the flexure tongue and the load beam is more stable and durable than the contact between stainless steel and silicon (which is less durable than stainless steel). Thus, not only does the contact between the flexure tongue and the load beam, as depicted by FIG. 2, not result in any damage to the microactuator, but it also reduces or eliminates the damage (such as chipping or dinging) to either the stainless steel load beam or the stainless steel flexure tongue.

Figure 3:
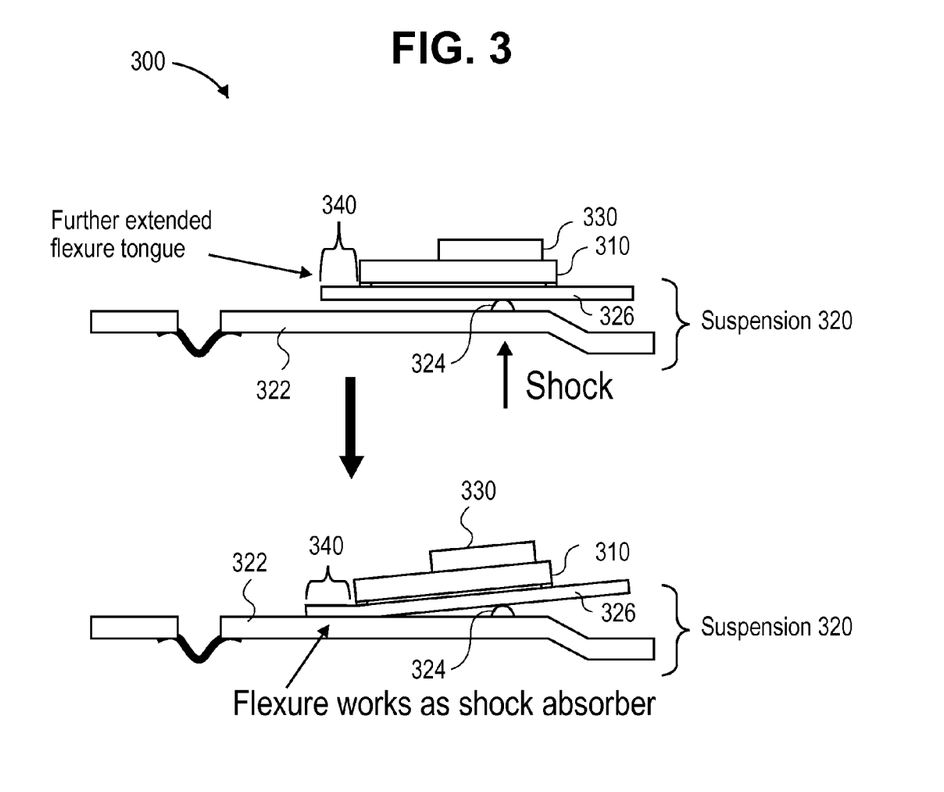
FIG. 3 is an illustration of a microactuator mounted on a suspension according to a second embodiment of the invention.

FIG. 3 is an illustration of a microactuator mounted on a suspension according to another embodiment of the invention. In the embodiment depicted in FIG. 3, the flexure tongue comprises a tip portion that extends beyond the edge of the microactuator that is furthest from the gimbal. The tip portion of the flexure tongue may deform to act as shock absorber when the HDD receives a mechanical shock. In such an embodiment, the flexure tongue, including the tip portion, and the load beam may both be compromised of stainless steel, thereby resulting in a durable and stable point of contact between the tip portion and the load beam when the HDD experiences a mechanical shock.

Figure 4A:
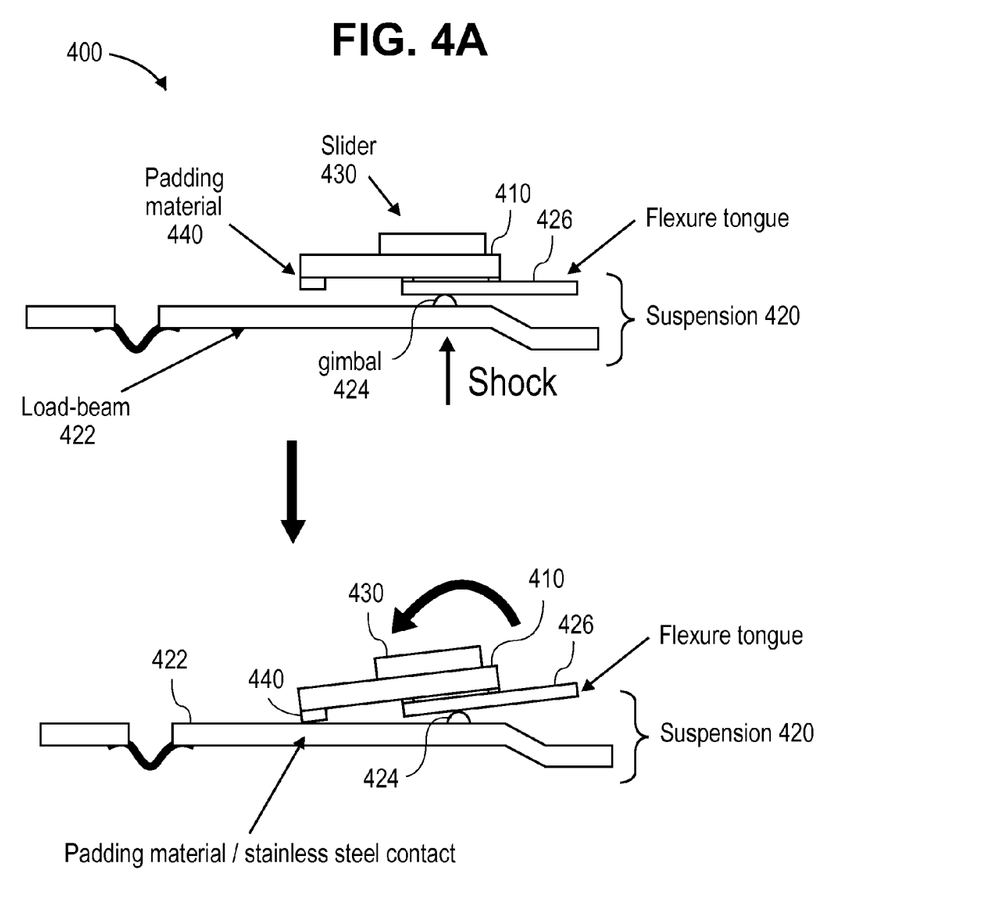
FIG. 4A is an illustration of a microactuator mounted on a suspension according to a third embodiment of the invention.
Figure 4B:
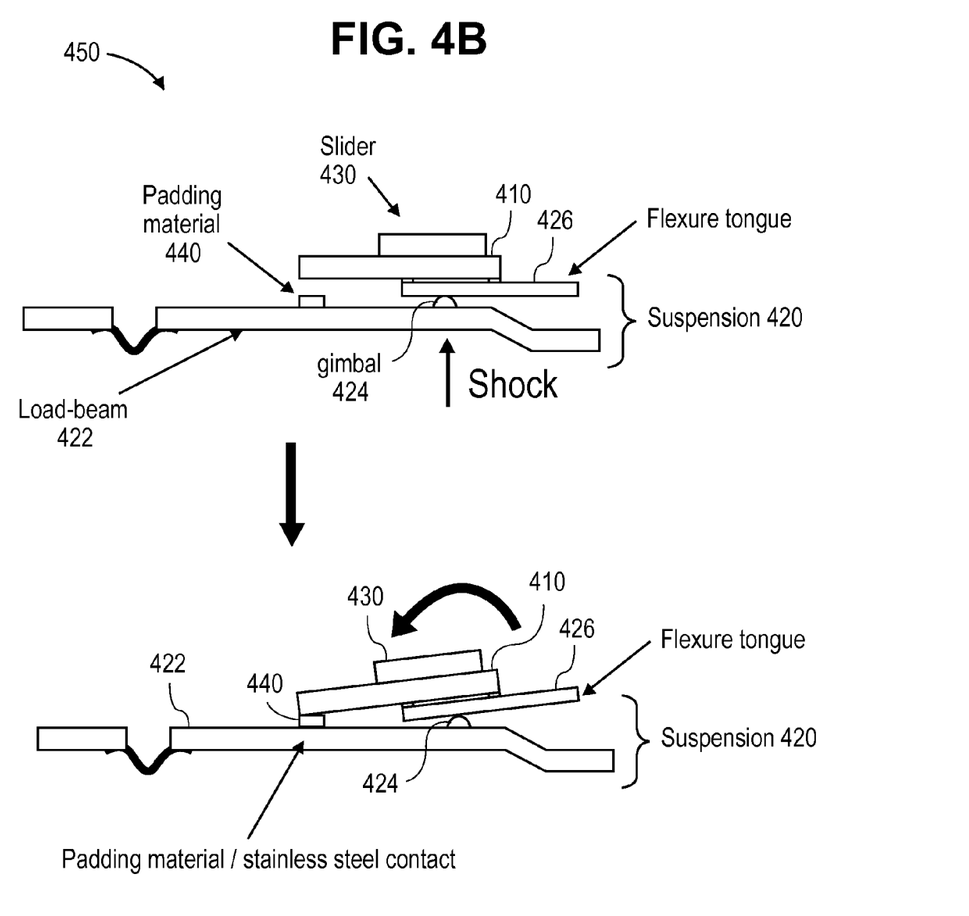
FIG. 4B is an illustration of padding material applied to a load beam according to an embodiment of the invention.

FIG. 4A is an illustration of a microactuator mounted on a suspension according to yet another embodiment of the invention. As shown in FIG. 4A, padding material may be used to prevent the microactuator from making contact with the load beam when the HDD experiences a mechanical shock. As shown in FIG. 4A, the padding material may be affixed (a) on a face of the microactuator which opposes the load beam, and (b) at or near the edge of the microactuator that is furthest from the gimbal. While not depicted in FIG. 4A, padding material may also be applied to the flexure tongue to prevent the flexure tongue from making contact with the load beam when the HDD receives a mechanical shock. Also, while not depicted in FIG. 4A, padding material may also be applied on the surface of the load beam, instead of or in addition to applying the padding material as shown in FIG. 4A, to prevent the microactuator from making contact with the load beam when the HDD experiences a mechanical shock. For example, FIG. 4B depicts an embodiment where padding material is applied to the surface of the load beam to prevent the microactuator from making contact with the load beam when the HDD experiences a mechanical shock.

Advantageously, embodiments of the invention prevent damage, such as breaking, chipping, or cracking, from occurring to the microactuator when the HDD experiences a mechanical shock. Additionally, when an HDD according to embodiments of the invention does experience a mechanical shock, the portion of the suspension which does make contact with the load beam is compromised of a more durable material than prior solutions, which results in the introduction of fewer, if any, airborne particles within the enclosure of the HDD.

Other embodiments of the invention may protect components of a hard-disk drive (HDD) other than a microactuator. For example, embodiments of the invention may protect a laser diode from mechanical shock. Thus, embodiments of the invention may be used to protect a wide variety of components in a hard-disk drive (HDD), including any fragile component that is attached between a slider and a flexure tongue. Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Approaches for protecting one or more components of a hard-disk drive (HDD) from mechanical shock are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Physical Description of Illustrative Embodiments of the Invention

Figure 5:
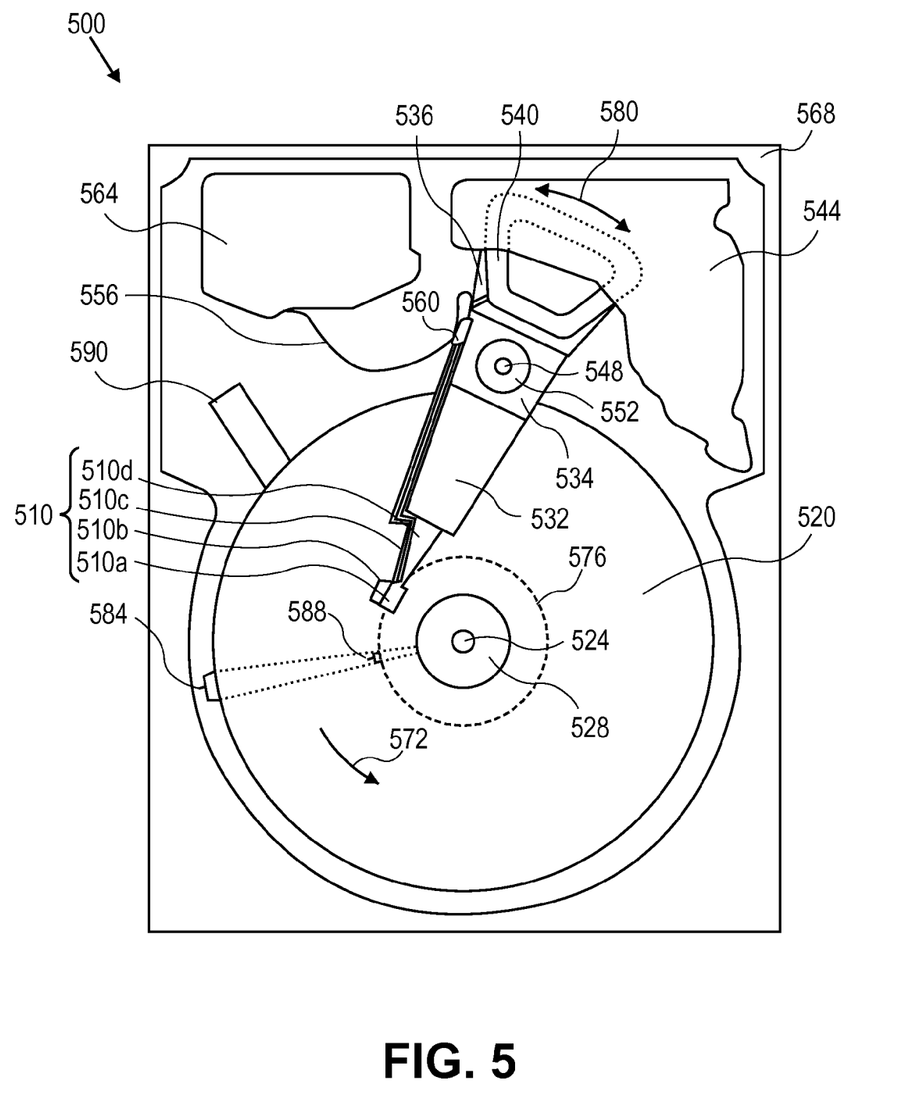
FIG. 5 is an illustration of a plan view of an HDD according to an embodiment of the invention.

With reference to FIG. 5, in accordance with an embodiment of the present invention, a plan view of a HDD 500 is shown. FIG. 5 illustrates the functional arrangement of components of the HDD including a slider 510b including a magnetic-recording head 510a. The HDD 500 includes at least one Head Gimbal Assembly (HGA) 510 including the head 510a, a lead suspension 510c attached to the head 510a, and a load beam 510d attached to the slider 510b, which includes the head 510a at a distal end of the slider 510b; the slider 510b is attached at the distal end of the load beam 510d to a gimbal portion of the load beam 510d. The HDD 500 also includes at least one magnetic-recording disk 520 rotatably mounted on a spindle 524 and a drive motor (not shown) attached to the spindle 524 for rotating the disk 520. The head 510a includes a write element, a so-called writer, and a read element, a so-called reader, for respectively writing and reading information stored on the disk 520 of the HDD 500. The disk 520 or a plurality (not shown) of disks may be affixed to the spindle 524 with a disk clamp 528. The HDD 500 further includes an arm 532 attached to the HGA 510, a carriage 534, a voice-coil motor (VCM) that includes an armature 536 including a voice coil 540 attached to the carriage 534; and a stator 544 including a voice-coil magnet (not shown); the armature 536 of the VCM is attached to the carriage 534 and is configured to move the arm 532 and the HGA 510 to access portions of the disk 520 being mounted on a pivot-shaft 548 with an interposed pivot-bearing assembly 552.

With further reference to FIG. 5, in accordance with an embodiment of the present invention, electrical signals, for example, current to the voice coil 540 of the VCM, write signal to and read signal from the Perpendicular Magnetic Recording (PMR) head 510a, are provided by a flexible cable 556. Interconnection between the flexible cable 556 and the head 510a may be provided by an arm-electronics (AE) module 560, which may have an on-board pre-amplifier for the read signal, as well as other read-channel and write-channel electronic components. The flexible cable 556 is coupled to an electrical-connector block 564, which provides electrical communication through electrical feedthroughs (not shown) provided by an HDD housing 568. The HDD housing 568, also referred to as a casting, depending upon whether the HDD housing is cast, in conjunction with an HDD cover (not shown) provides a sealed, protective enclosure for the information storage components of the HDD 500.

With further reference to FIG. 5, in accordance with an embodiment of the present invention, other electronic components (not shown), including a disk controller and servo electronics including a digital-signal processor (DSP), provide electrical signals to the drive motor, the voice coil 540 of the VCM and the head 510a of the HGA 510. The electrical signal provided to the drive motor enables the drive motor to spin providing a torque to the spindle 524 which is in turn transmitted to the disk 520 that is affixed to the spindle 524 by the disk clamp 528; as a result, the disk 520 spins in a direction 572. The spinning disk 520 creates a cushion of air that acts as an air-bearing on which the air-bearing surface (ABS) of the slider 510b rides so that the slider 510b flies above the surface of the disk 520 without making contact with a thin magnetic-recording medium of the disk 520 in which information is recorded. The electrical signal provided to the voice coil 540 of the VCM enables the head 510a of the HGA 510 to access a track 576 on which information is recorded. Thus, the armature 536 of the VCM swings through an arc 580 which enables the HGA 510 attached to the armature 536 by the arm 532 to access various tracks on the disk 520. Information is stored on the disk 520 in a plurality of concentric tracks (not shown) arranged in sectors on the disk 520, for example, sector 584. Correspondingly, each track is composed of a plurality of sectored track portions, for example, sectored track portion 588. Each sectored track portion 588 is composed of recorded data and a header containing a servo-burst-signal pattern, for example, an ABCD-servo-burst-signal pattern, information that identifies the track 576, and error correction code information. In accessing the track 576, the read element of the head 510a of the HGA 510 reads the servo-burst-signal pattern which provides a position-error-signal (PES) to the servo electronics, which controls the electrical signal provided to the voice coil 540 of the VCM, enabling the head 510a to follow the track 576. Upon finding the track 576 and identifying a particular sectored track portion 588, the head 510a either reads data from the track 576 or writes data to the track 576 depending on instructions received by the disk controller from an external agent, for example, a microprocessor of a computer system.

Embodiments of the present invention also encompass HDD 500 that includes the HGA 510, the disk 520 rotatably mounted on the spindle 524, the arm 532 attached to the HGA 510 including the slider 510b including the head 510a. Therefore, embodiments of the present invention incorporate within the environment of the HDD 500, without limitation, the subsequently described embodiments of the invention for protecting one or more components of a hard-disk drive (HDD) from mechanical shock as further described in the following discussion. Similarly, embodiments of the invention incorporate within the environment of the HGA 510, without limitation, the subsequently described embodiments of the invention for protecting one or more components of a hard-disk drive (HDD) from mechanical shock as further described in the following discussion.

Figure 6:
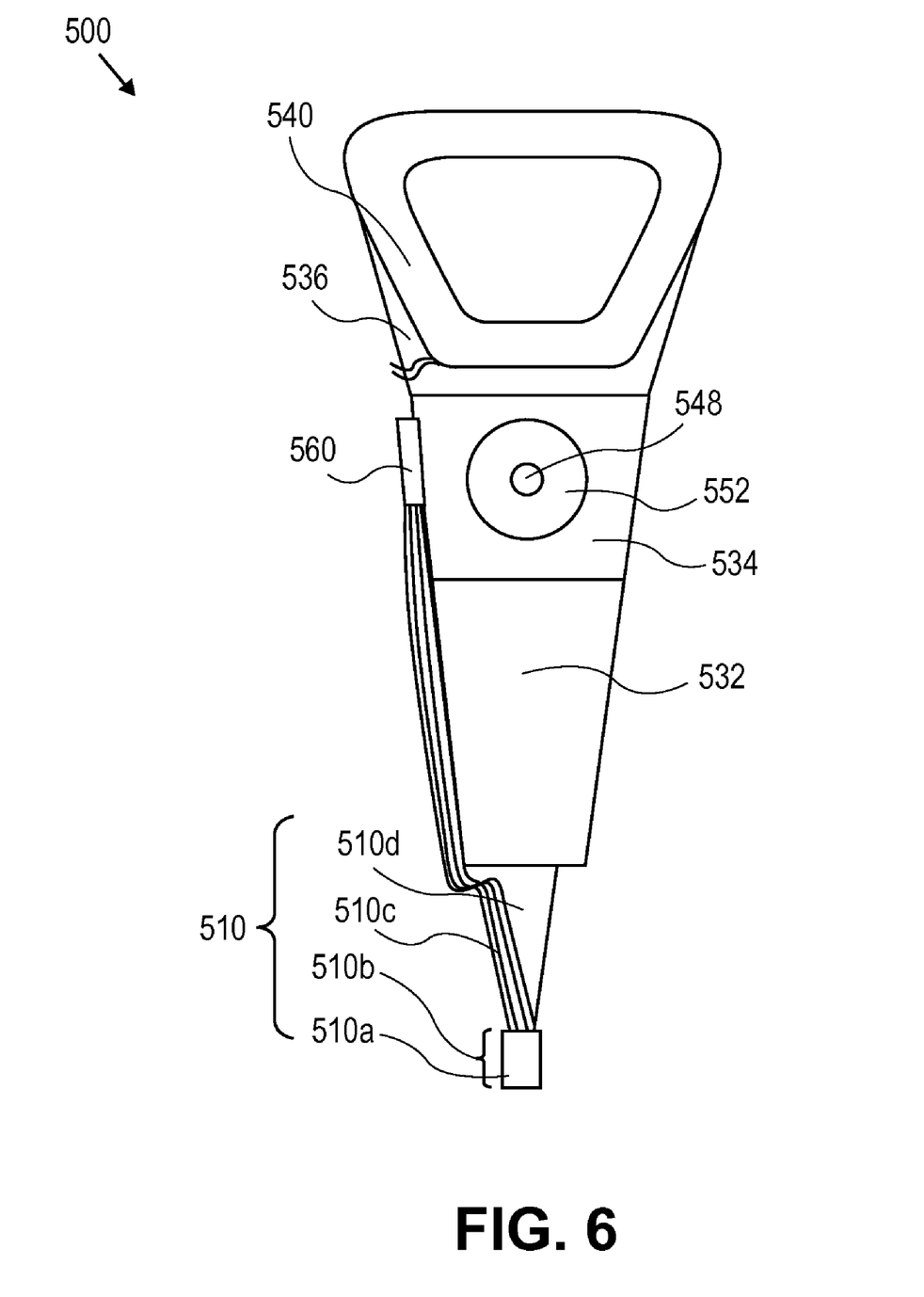
FIG. 6 is an illustration of a plan view of a head-arm-assembly (HAA) according to an embodiment of the invention.

With reference now to FIG. 6, in accordance with an embodiment of the invention, a plan view of a head-arm-assembly (HAA) including the HGA 510 is shown. FIG. 6 illustrates the functional arrangement of the HAA with respect to the HGA 510. The HAA includes the arm 532 and HGA 510 including the slider 510b including the head 510a. The HAA is attached at the arm 532 to the carriage 534. In the case of an HDD having multiple disks, or platters as disks are sometimes referred to in the art, the carriage 534 is called an "E-block," or comb, because the carriage is arranged to carry a ganged array of arms that gives it the appearance of a comb. As shown in FIG. 6, the armature 536 of the VCM is attached to the carriage 534 and the voice coil 540 is attached to the armature 536. The AE 560 may be attached to the carriage 534 as shown. The carriage 534 is mounted on the pivot-shaft 548 with the interposed pivot-bearing assembly 552.

Figure 7:
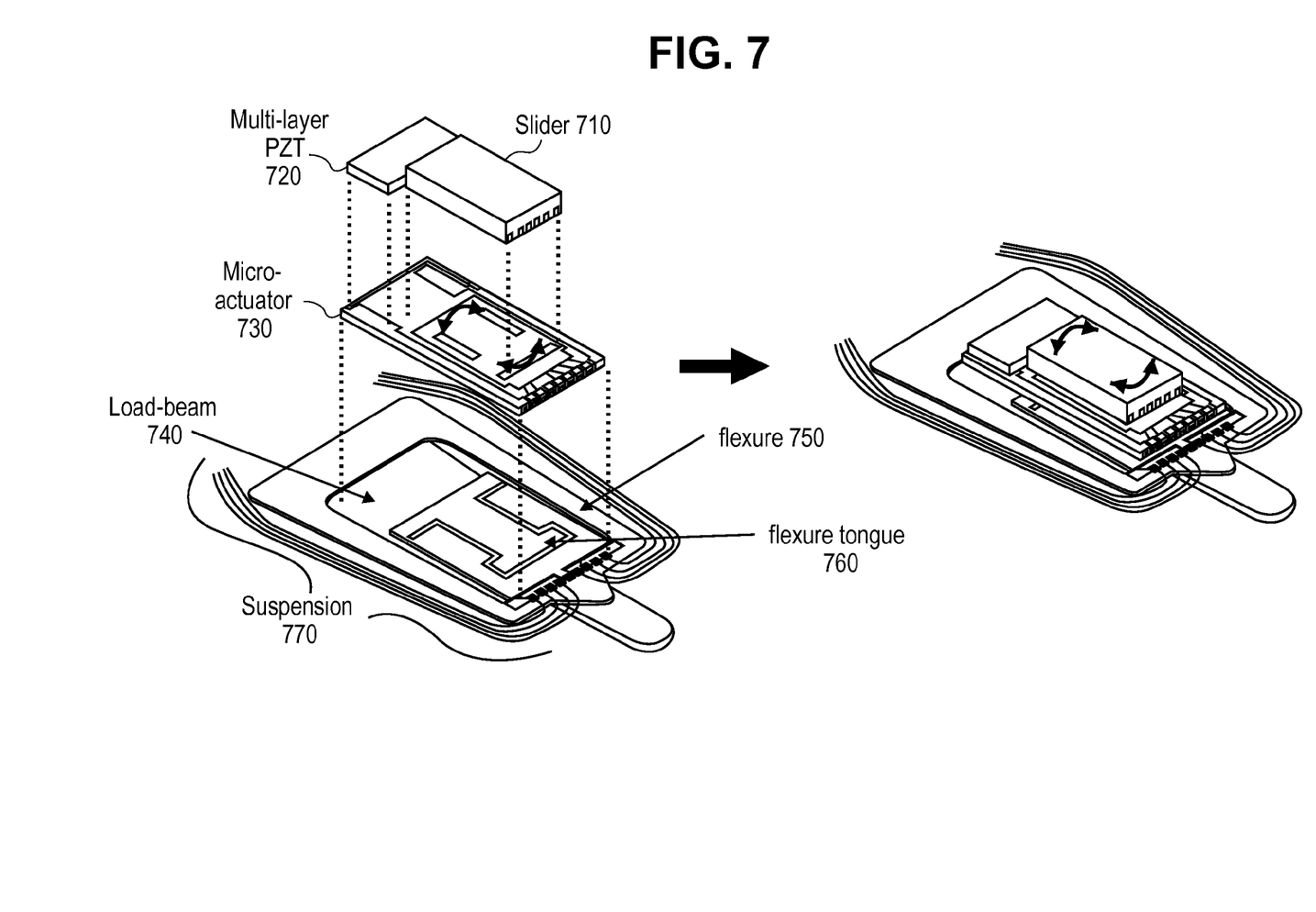
FIG. 7 is an exploded view of a microactuator mounted on a suspension according to an embodiment of the invention.

FIG. 7 is an exploded view 700 of a microactuator 730 mounted on a suspension 770 according to an embodiment of the invention. Microactuator 730 is a small actuator that is affixed or mounted on suspension 770. Slider 710 is affixed or mounted on microactuator 730. Microactuator 730 is responsible for moving slider 710 relative to suspension 770 so that slider 710 may precisely adjust the position of the read/write head to enable the read/write head to read data from and write data to the surface of the platter. Microactuator 730 may be composed using a silicon based material.

In an embodiment, multi-layer PZT 720 may be affixed or mounted on microactuator 730. Multi-layer PZT 720 is a component that corrects the displacement of slider 710 on a small scale to compensate for the resonance tolerance of the voice coil motor and the suspension. While multi-layer PZT 720 is not depicted in FIGS. 2-4, embodiments of the invention may, but need not, employ multi-layer PZT 720.

While not depicted in FIG. 7, slider 710 has at least one read/write head mounted or affixed thereon. Suspension 770 comprises load beam 740, flexure 750, and flexure tongue 760. Having described an illustrative description of a hard-disk drive (HDD) according to embodiments of the invention, additional information about protecting a microactuator from a mechanical shock will now be presented.

Protecting a Microactuator from a Mechanical Shock

FIG. 2 is an illustration 200 of microactuator 210 mounted on suspension 220 according to a first embodiment of the invention. As shown by FIG. 2, suspension 220 comprises load beam 222, gimbal 224, and flexure tongue 226. Microactuator 210 is mounted or affixed on suspension 220. Slider 230 is mounted or affixed to microactuator 210 as shown in FIG. 2.

Flexure tongue 226 extends to at least the edge of microactuator 210 that is furthest from gimbal 224. Flexure tongue 226 prevents microactuator 210 from making contact with load beam 22 when the hard-disk drive (HDD) receives a mechanical shock.

In an embodiment, flexure tongue 226 may cover that entire surface area of the face of microactuator 210 which is coupled to flexure tongue 226. In this way, no portion of the side of microactuator 210 which opposes the load beam can make contact with load beam 222; thus, if suspension 220 receives a mechanical shock, at best flexure tongue 226 will make contact with load beam 226, but microactuator 210 cannot make contact with lead beam 226.

Flexure tongue 226 may be composed using stainless steel. Load beam 222 may also be composed using stainless steel. As a result, the contact between flexure tongue 226 and load beam 222 is more durable and stable than contact between stainless steel and a silicon based material. As a result, the likelihood of harmful airborne particles being introduced into the interior of the HDD is reduced or eliminated.

In an embodiment (not depicted by FIG. 2), a padding material may be affixed (a) on a face of flexure tongue 226 which opposes load beam 222, and (b) at or near the edge of flexure tongue 226 that is furthest from gimbal 224. In such an embodiment, the padding material prevents flexure tongue 226 from making contact with load beam 222 when the hard-disk drive (HDD) receives a mechanical shock. The padding material may correspond to or comprise rubber, polyimide, epoxy, or a metal (such as stainless steel).

FIG. 3 is an illustration 300 of microactuator 310 mounted on suspension 320 according to another embodiment of the invention. As shown in FIG. 3, suspension 320 comprises load beam 322, gimbal 324, and flexure tongue 326. Microactuator 310 is mounted or affixed on suspension 320. Slider 330 is mounted or affixed on microactuator 310.

Flexure tongue 326 comprises a tip portion 340 that extends beyond the edge of microactuator 310 that is furthest from gimbal 324. Flexure tongue 326 prevents microactuator 310 from making contact with load beam 322 when the hard-disk drive (HDD) receives a mechanical shock. In an embodiment, tip portion 340 of flexure tongue 326 deforms to act as shock absorber when the hard-disk drive (HDD) receives a mechanical shock.

In an embodiment, flexure tongue 326 may cover that entire surface area of the face of microactuator 310 which is coupled to flexure tongue 326. In this way, no portion of the side of microactuator 310 which opposes the load beam can make contact with load beam 322; thus, if suspension 320 receives a mechanical shock, at best flexure tongue 326 will make contact with load beam 322, but microactuator 310 cannot make contact with load beam 322.

Flexure tongue 326 may be composed using stainless steel. Load beam 322 may also be composed using stainless steel. As a result, the contact between flexure tongue 326 and load beam 322 is more durable and stable than contact between stainless steel and a silicon based material. As a result, the likelihood of harmful airborne particles being introduced into the interior of the HDD is reduced or eliminated.

In an embodiment (not depicted by FIG. 3), a padding material may be affixed (a) on a face of flexure tongue 326, including but not limited to tip portion 340, which opposes load beam 322, and (b) at or near the edge of flexure tongue 326 that is furthest from gimbal 324. In such an embodiment, the padding material prevents flexure tongue 326 from making contact with load beam 322 when the hard-disk drive (HDD) receives a mechanical shock. The padding material may correspond to or comprise rubber, polyimide, epoxy, or a metal (such as stainless steel).

FIG. 4A is an illustration 400 of microactuator 410 mounted or affixed on suspension 420 according to another embodiment of the invention. Slider 430 may be mounted or affixed to microactuator 410 as shown in FIG. 4.

Suspension 420 comprises load beam 422, gimbal 424, and flexure tongue 426. Padding material 440 is affixed (a) on a face of microactuator 410 which opposes load beam 422, and (b) at or near the edge of microactuator 410 that is furthest from gimbal 426. Padding material 440 prevents microactuator 410 from making contact with load beam 422 when the hard-disk drive (HDD) receives a mechanical shock. Padding material 440 may comprise rubber, polyimide, epoxy, or a metal.

In other embodiments of the invention, padding material 440 may be applied to load beam 422 instead of, or in addition to, applying padding material 440 as depicted in FIG. 4A. To illustrate, consider FIG. 4B, which is an illustration 400 of padding material 440 applied to load beam 422 according to an embodiment of the invention. By applying padding material 440 to load beam 422, the objective of preventing microactuator 410 from making direct contact with load beam 422 when a mechanical shock occurs may be achieved.

In certain embodiments of the invention (not depicted), padding material 440 may be applied as depicted in FIG. 4A in addition to applying padding material 440 as depicted in FIG. 4B. In such an embodiment, the padding material applied to the load beam should be located in a position such that the padding material applied to the underside of the flexure tongue or the component being protected (such as a microactuator or a laser diode, for example) makes contact with the padding material applied to the load beam when the hard-disk drive (HDD) receives a mechanical shock Protecting Other Components from a Mechanical Shock While embodiments of the invention have chiefly been described with reference to protecting a microactuator from mechanical shock, those skilled in the art shall appreciate that the teachings herein may be used to protect a wide variety of components in a hard-disk drive (HDD) from mechanical shock. Thus, other embodiments of the invention may protect components of a hard-disk drive (HDD) other than a microactuator. For example, embodiments of the invention may protect a laser diode from mechanical shock. Embodiments of the invention may be used to protect a wide variety of components in a hard-disk drive (HDD), including any fragile component that is attached between a slider and a flexure tongue.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD), comprising:
   an enclosure;
   a magnetic-recording head coupled to a slider;
   a microactuator coupled to the slider;
   a magnetic-recording disk rotatably mounted on a spindle;
   a drive motor having a motor shaft attached to said spindle for rotating said magnetic-recording disk;
   a voice-coil motor configured to move said magnetic-recording head to access portions of said magnetic-recording disk; and
   a suspension that comprises a load beam, a gimbal, and a flexure tongue, wherein the microactuator is mounted on the suspension, wherein the flexure tongue extends to at least the edge of the microactuator that is furthest from the gimbal, and wherein the flexure tongue prevents the microactuator from contacting the load beam when the hard-disk drive (HDD) receives a mechanical shock,
   wherein the flexure tongue comprises a tip portion that extends beyond the edge of the microactuator that is furthest from the gimbal, and wherein the flexure tongue prevents the microactuator from contacting the load beam when the hard-disk drive (HDD) receives a mechanical shock.

2. The hard-disk drive (HDD) of claim 1, wherein the flexure tongue is stainless steel.

3. The hard-disk drive (HDD) of claim 1, wherein a padding material is affixed (a) on a face of the flexure tongue which opposes the load beam, and (b) at or near the edge of the flexure tongue that is furthest from the gimbal, and wherein the padding material prevents the flexure tongue from making contact with the load beam when the hard-disk drive (HDD) receives a mechanical shock.

4. The hard-disk drive (HDD) of claim 3, wherein the padding material comprises rubber, polyimide, epoxy, or a metal.

5. The hard-disk drive (HDD) of claim 1, wherein the flexure tongue covers that entire surface area of a face of the microactuator which is coupled to the flexure tongue.

6. The hard-disk drive (HDD) of claim 1, wherein a padding material is affixed to the load beam in a location where the padding material makes physical contact with the flexure tongue when the flexure tongue moves in response to the hard-disk drive (HDD) receiving the mechanical shock.

7. The hard-disk drive (HDD) of claim 1, wherein tip portion of the flexure tongue deforms to act as shock absorber when the hard-disk drive (HDD) receives a mechanical shock.

8. A suspension, comprising:
a load beam;
a microactuator mounted on the suspension;
a gimbal; and
a flexure tongue;
wherein the flexure tongue has a length that extends to at least the edge of the microactuator which is furthest from the gimbal, wherein the flexure tongue prevents the microactuator, from contacting the load beam when the suspension receives a mechanical shock, and wherein the flexure tongue comprises a tip portion that extends beyond the edge of the microactuator that is furthest from the gimbal.

9. The suspension of claim 8, wherein the flexure tongue is stainless steel.

10. The suspension of claim 8, wherein a padding material is affixed (a) on a face of the flexure tongue which opposes the load beam, and (b) at or near the edge of the flexure tongue that is furthest from the gimbal, and wherein the padding material prevents the flexure tongue from making contact with the load beam when the suspension receives a mechanical shock.

11. The suspension of claim 10, wherein the padding material comprises rubber, polyimide, epoxy, or a metal.

* * * * *